US011928924B2

(12) United States Patent
Moore et al.

(10) Patent No.: US 11,928,924 B2
(45) **Date of Patent: *Mar. 12, 2024**

(54) SYSTEMS AND METHODS FOR VERIFYING PLAYER IDENTITY AT A TABLE GAME

(71) Applicant: Walker Digital Table Systems, LLC, Las Vegas, NV (US)

(72) Inventors: Stephen Moore, Las Vegas, NV (US); Magdalena Mik Fincham, Ridgefield, CT (US)

(73) Assignee: Walker Digital Table Systems, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,197

(22) Filed: Jan. 31, 2022

(65) Prior Publication Data

US 2022/0157118 A1 May 19, 2022

Related U.S. Application Data

(63) Continuation of application No. 17/010,881, filed on Sep. 3, 2020, now Pat. No. 11,238,695, which is a continuation of application No. PCT/US2019/020841, filed on Mar. 5, 2019.

(60) Provisional application No. 62/638,416, filed on Mar. 5, 2018.

(51) Int. Cl.
*G07F 17/32* (2006.01)

(52) U.S. Cl.
CPC ...... *G07F 17/3239* (2013.01); *G07F 17/3241* (2013.01)

(58) Field of Classification Search
CPC ............. G07F 17/3239; G07F 17/3241; G07F 17/3237; G07F 17/3232; G07F 17/322; G07F 17/3248; G07F 17/3251
See application file for complete search history.

(56) References Cited

U.S. PATENT DOCUMENTS

| | | | | |
|---|---|---|---|---|
| 6,712,696 | B2 | 3/2004 | Soltys et al. | |
| 8,724,856 | B1 * | 5/2014 | King | G07D 7/2008 340/5.82 |
| 11,238,695 | B2 * | 2/2022 | Moore | G07F 17/3237 |
| 2001/0016515 | A1 | 8/2001 | Oliver | |

(Continued)

OTHER PUBLICATIONS

International Search Report for PCT/US2019/20841 dated May 10, 2019; 2 pps.

(Continued)

*Primary Examiner* — Jasson H Yoo
(74) *Attorney, Agent, or Firm* — Rowan Tree Law Group, PLLC; Magdalena M. Fincham

(57) ABSTRACT

Systems, processes and articles of manufacture provide for a player identity verification system that allows a gaming establishment (e.g., a casino) to determine or verify a player's identity upon certain qualifying activities being determined (e.g., when a player is initiating a wagering session at a table game or placing a wager). In accordance with one embodiment, a live image of a player participating in a qualifying activity (e.g., placement of a wager) is compared to a stored image of a player that is associated with one or more casino chips being used as the wager; a verification of the identity of the player placing the wager is performed by matching the live image to the stored image.

23 Claims, 7 Drawing Sheets

(56) References Cited

U.S. PATENT DOCUMENTS

| | | | | |
|---|---|---|---|---|
| 2006/0177109 | A1 * | 8/2006 | Storch | A63F 1/00 382/118 |
| 2007/0094721 | A1 * | 4/2007 | Nguyen | G07F 1/06 726/9 |
| 2007/0117623 | A1 * | 5/2007 | Nelson | G06Q 30/02 463/29 |
| 2014/0274357 | A1 | 9/2014 | Nguyen | |
| 2016/0016071 | A1 | 1/2016 | Walker | |
| 2016/0121201 | A1 | 5/2016 | Moore et al. | |

OTHER PUBLICATIONS

Written Opinion for PCT/US2019/20841 dated May 10, 2019; 15 pps.
Kim et al. “Automated Poker.”, Dept. of CIS—Senior Design 2009-2010. Retrieved on Apr. 23, 2019 (Apr. 23, 2019) from <http://citeseerx.ist.psu.edu/viewdoc/download?doi=10.1.1.799.8112&rep1&type=pdf> entire document; 20 pps.
International Preliminary Report on Patentability for PCT/US2019/20841 dated Sep. 17, 2020; 8 pps.
Office Action for U.S. Appl. No. 17/010,881 dated Jun. 10, 2021; 10 pps.
Notice of Allowance for U.S. Appl. No. 17/010,881 dated Sep. 22, 2021; 7 pps.
Examination Report for Australian Application No. 2019231259 dated Oct. 4, 2023; 2 pps.

* cited by examiner

400A

| CHIP ID 402 | PLAYER ID 404 | CHIP DENOM 406 |
|---|---|---|
| C-1023-34 | P-001 | 1000 |
| C-2038-55 | P-001 | 1000 |
| C-3928-74 | P-001 | 500 |
| C-3947-32 | P-002 | 500 |
| C-3949-21 | P-002 | 100 |

FIG. 4A

400B

| PLAYER ID 410 | PLAYER STATUS 412 | PLAYER CONTACT 414 | IMAGE DATA 416 |
|---|---|---|---|
| P-001 | Gold | joe@hotmail.com | 40383.jpg |
| P-002 | Gold | erin@gmail.com | 43728.jpg; 38292.jpg |
| P-003 | Restricted | jed@company.com | 28392.jpg; 28394.jpg |
| P-004 | Silver | amy@cloud.com | 37281.jpg |
| P-005 | Platinum | pat@mail.com | 98273.jpg |

FIG. 4B

400C

| CAMERA ID 422 | TABLE ID 424 | POSITION(S) 426 |
|---|---|---|
| CA-19302 | T001 | 1 - 4 |
| CA-74829 | T001 | 5 - 7 |
| CA-47829 | T002 | 1 - 6 |
| CA-38402 | T003 | 1 - 5 |
| CA-87392 | T003 | 6 - 10 |

*FIG. 4C*

SYSTEMS AND METHODS FOR VERIFYING PLAYER IDENTITY AT A TABLE GAME

The present application is a Continuation of U.S. patent application Ser. No. 17/010,881, titled SYSTEMS AND METHODS FOR VERIFYING PLAYER IDENTITY AT A TABLE GAME and filed on Sep. 3, 2020 in the name of Moore et al, which application is a Continuation of PCT Application No. PCT/US2019/2084, titled SYSTEMS AND METHODS FOR VERIFYING PLAYER IDENTITY AT A TABLE GAME filed on Mar. 5, 2019 in the name of Moore et al., which PCT Application claims the benefit of U.S. Provisional Application No. 62/638,416 filed on Mar. 5, 2018 in the name of Moore et al. and titled SYSTEMS AND METHODS FOR VERIFYING PLAYER IDENTITY AT A TABLE GAME. The entirety of each of these applications is incorporated by reference herein for all purpose.

BACKGROUND

The embodiments described herein are directed to table game systems in which players place wagers on outcomes of table games. In accordance with some embodiments the table game systems may be equipped with sensors (e.g., RFID sensors or optical recognition sensors) to facilitate the detection of data and/or events related to the table game system (e.g., the placement of a wagering chip). In accordance with some embodiments, it may be desirable to determine or verify the identity of a player who is placing a game token (e.g., a casino or wagering chip) for the game or otherwise participating in a qualifying activity associated with the table game system.

BRIEF DESCRIPTION OF FIGURES

FIG. 4A illustrates an example table database structure depicting wagering token data that may be stored in a database or other memory device, in accordance with at least some embodiments described herein.

FIG. 4B illustrates an example table database structure depicting player data that may be stored in a database or other memory device, in accordance with at least some embodiments described herein.

FIG. 4C illustrates an example table database structure depicting camera data that may be stored in a database or other memory device, in accordance with at least some embodiments described herein.

DETAILED DESCRIPTION OF EMBODIMENTS

Figure 1:
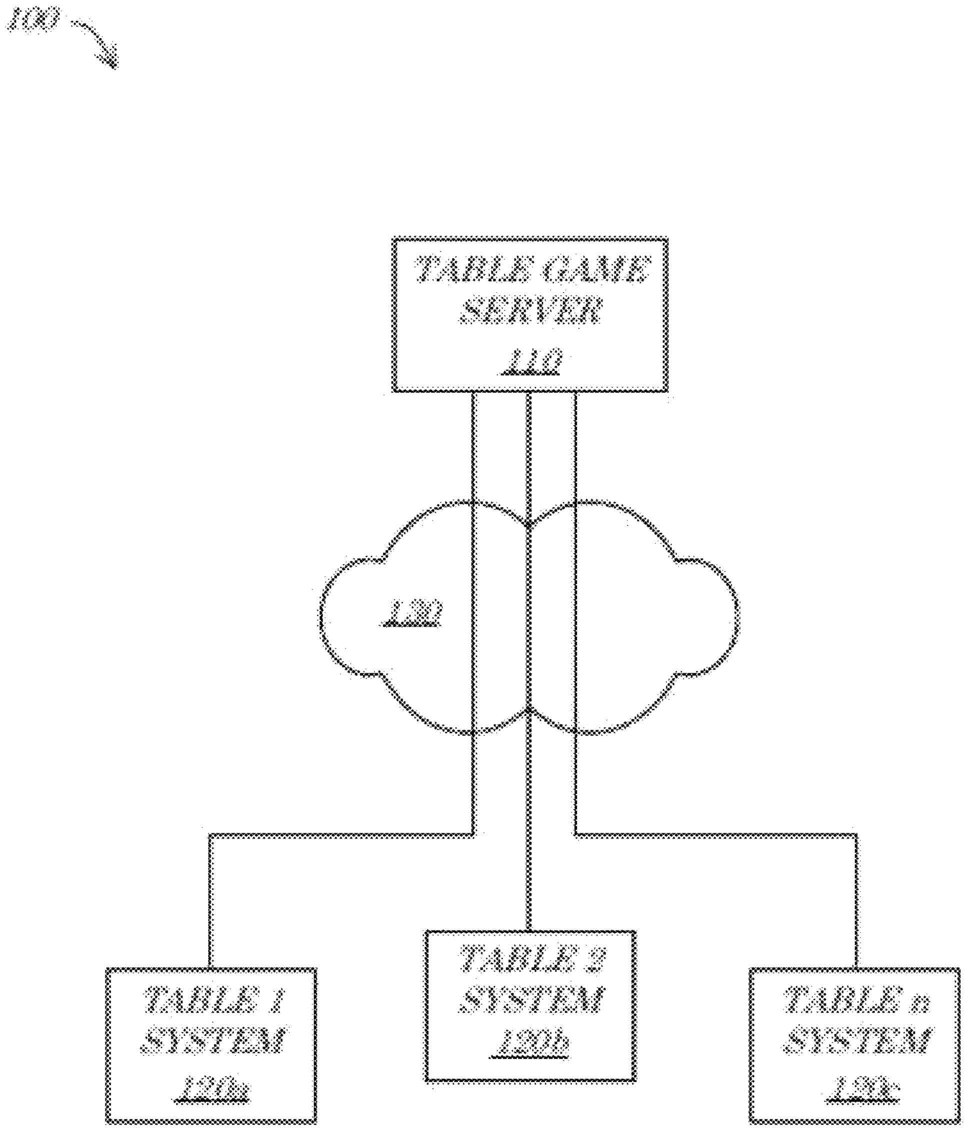
FIG. 1 illustrates an example system operable to facilitate at least some embodiments described herein.

Applicant has recognized that in certain jurisdictions and/or circumstances it may be desirable to verify or determine an identity of a player wagering in a gaming establishment (e.g., at a table game), such as prior to accepting a wager (or prior to completing a game play for which the wager was placed), at the beginning of a new wagering session or whenever the player places a casino chip on the table. In certain embodiments, such determination or verification of a player's identity may be performed at periodic or non-periodic intervals (e.g., randomly, every X wagers accepted, every X minutes, etc.) while in other embodiments such verification may be performed whenever a qualifying activity is determined. For example, in some embodiments such determination of a player's identity may be performed whenever the player begins a new wagering session (e.g., at a particular table or other location of a wagering establishment or on a particular day), places a new wager on a table game or places a new casino chip on the table. Such verification may be particularly beneficial at table games (e.g., blackjack, poker, baccarat, pai gow) where players are placing wagers by physically placing tangible wagering indicia (e.g., casino chips) on betting spots of a table. Casino chips or other tangible wagering indicia may be used by a player dishonestly (e.g., player "Jon Chen" may attempt to place a wager under an assumed identity or alias such as "Jon Liu"). For example, a player who has been banned from wagering at a gaming establishment or who is associated with wagering limits may not wish to accurately identify himself when attempting to place a wager. In some jurisdiction, certain gamblers may be tracked as "problem gamblers" whose wagering activity should be limited or banned for their own protection. Some gaming establishments may desire to limit, ban or track wagers made by particular players for various reasons. Sometimes, a player may steal a casino chip from another player and attempt to use it for a wager and a gaming establishment may desire to prevent such wagers. Thus, for a variety of reasons and goals certain jurisdictions and/or gaming establishments may find it beneficial to determine or verify an identity of a player prior to accepting a wager from the player.

Applicant has further recognized that, for a variety of reasons, it may be beneficial to associate in a memory a particular casino chip as belonging to a particular player. For example, a unique identifier of a casino chip may be associated with a unique identifier of a player. Over the past few years, more and more gaming establishments have begun to utilize casino chips which include Radio Frequency Identification ("RFID") technology, which allows each casino chips movements to be identified and tracked via RFID readers or antennas placed on table games and other areas in the gaming establishment. Applicant has recognized that the availability of RFID technology in casino chips now makes it practical to associate (and disassociate) particular casino chips with particular players. Thus, in various (but not all) embodiments described herein, Applicant relies on an association of a particular casino chip with a particular player. A casino chip may be associated with a particular player, for example, at buy in (e.g., when the player exchanges monetary value to purchase the casino chips) or when the player wins the casino chip as a result of a wager. Thus, the player identifier associated with a given casino chip may change over time as the casino chip is first provided to a first player by the casino (e.g., by a dealer at a table when the player initially buys in, or at a casino cage), and then if the casino chip is lost by the player as a result of the wager and subsequently provided to a second player as a result of a winning wager. Applicant's U.S. Pat. No. 9,694,272 to Moore et al., titled RFID-ENABLED SYSTEMS FOR FACILITATING TABLE GAMES and issued on Jul. 4, 2017 (application Ser. No. 14/994,127, filed on Jan. 12, 2016), as well as U.S. patent application Ser. No.

15/813,151 to Moore et al. and titled SYSTEMS AND METHODS FOR UTILIZING RFID TECHNOLOGY TO FACILITATE A GAMING SYSTEM, filed on Nov. 14, 2017, each describe various methodologies and supporting systems for assigning, changing and tracking a player identifier in association with a casino chip identifier. Each of these patent applications is incorporated by reference herein for all purposes and particularly for supporting and enabling systems and methods for assigning, changing and tracking which player identifier, if any, is associated with a given casino chip at any given time.

In accordance with some embodiments, it is presumed that a preliminary process occurs in which casino chips provided to players in a gaming establishment are associated with the players in a memory (e.g., a casino chip database maintained by the gaming establishment). For example, when a player first purchases casino chips at a cage of the gaming establishment, the player provides identification means (e.g., a player tracking card, a passport, a driver's license, anonymous biometric identification, etc.) which uniquely identifies the player. The casino chips provided to the player each have a respective unique identifier associated therewith (e.g., indicated visually on the casino chips and/or transmitted from the casino chips via RFID or other technology, such that the unique identifier of each casino chip is recognizable and trackable within the gaming establishment).

In accordance with some embodiments, a casino employee who provides the casino chips to the player registers the unique player identifier of the player purchasing the casino chips (e.g., the unique player identifier provided by the player, such as a driver's license or passport number, or a unique player identifier generated for or assigned to the player by the gaming establishment, which is sometimes referred to as a 'refused name' identification or biometric identification) as being associated with each of the respective casino chips being provided to the player (e.g., the employee scans each of the chips after entering the player identifier using an RFID reader). If the player subsequently wagers a particular casino chip associated with the player and loses the wager such that the casino chip is collected from the player (e.g., by a dealer of a table game), the casino chip may be disassociated from the player in the memory. For example, the unique identifier of the chip may be deleted or otherwise removed from a record of the player which stores identifiers of casino chips associated with the player or the player identifier may be deleted or otherwise removed from a record of the casino chip. If, on the other hand, the player subsequently wins or otherwise obtains another casino chip, the unique identifier of this newly acquired casino chip may be associated with the unique player identifier of the player who won or otherwise obtained the casino chip (e.g., with the player identifier provided by the player upon placing a wager which resulted in the casino chip being won by the player). For example, the unique identifier of the chip may be added to a record of the player which stores identifiers of casino chips associated with the player or the player identifier may be added to a record of the casino chip.

In one embodiment, a dealer of the wagering game being played at a table may perform an action to allow a particular casino chip identifier to be associated with a player upon the player winning a wager at the table game and being provided the casino chip as a result (e.g., the dealer may swipe or scan the casino chip at a reader prior to providing it to the player or a sensor of the table may read the unique chip identifier of the casino chip once it is placed by the dealer at a particular location of the table associated with the player as a payout for a win).

Table 400B of FIG. 4B, described in detail herein, is one example of a table which may be stored in a memory of a computer operated by a gaming establishment, in which uniquely identified players may be associated with uniquely identified casino chips.

In accordance with some embodiments, a photo identification such as a passport or driver's license, when provided to casino personnel, may also be utilized to obtain at least one stored image of a player. As described herein, in some embodiments an image of a player may be stored and subsequently utilized to identify a player making a wager at the gaming establishment (e.g., by comparing a live image of the player to stored images of players). Accordingly, in some embodiments a photo or image of a player included in a photo identification document may be scanned at some point by casino personnel (e.g., at a time of buy in or when a player is registering to wager with the wagering establishment) and stored in a database in association with a unique player identifier of the player.

In accordance with one embodiment, systems and methods for verifying an identity of a player making a wager (or otherwise utilizing casino chips in the gaming establishment) provide for determining, capturing or accessing an image of the player making the wager or otherwise attempting to use casino chips. For example, an image of the player may be obtained via a camera or other image obtaining hardware at a table game, cage, point-of-sale register or other location, which camera captures an image of the player as the player is attempting to make a wager or just after the player has placed the wager (or as the player is otherwise attempting to use the casino chips). The image of the player obtained while, upon or just after the player is placing the wager or otherwise attempting to use the casino chips or which otherwise triggers a player identification process (collectively referred to as a "qualifying activity" herein) is referred to as a "live image" or "captured image" of the player herein (as contrasted with a previously stored image of the player obtained previous to the occurrence of a qualifying activity, which is referred to as a "stored image" herein). In one embodiment, the live image of the player obtained upon determining a qualifying activity is compared against one or more stored images (e.g., stored images of the same player and/or stored images of registered players, one of whom may be the same player). In one embodiment, the comparison of the images is performed to verify that it is indeed the player whose name or other identifier is associated with the casino chip involved in the qualifying activity who is the player in the live image (e.g. the player who is placing the wager). In another embodiment, the live image of the player associated with the qualifying activity is used to identify the player making the wager or participating in another type of activity that requires verifying the identity of the player (e.g., by comparing the live image of the player to stored images of registered players stored in a database and using facial recognition technology to find a match, then determining the player identifier associated with the matching stored image).

In accordance with one embodiment, at least one image-capturing device such as a camera may be associated with a table facilitating a table game at a gaming establishment. For example, one or more cameras (operable to capture still images and/or video) may be associated with the table. The table may have multiple player positions or bet spots thereon, such that a player at a given player position or bet spot may request to make a wager by placing one or more casino chips on the bet spot at the player position. In some embodiments, multiple players may be authorized or allowed to make wagers on a given bet spot (such bet spots may be referred to as shared bet spots or common bet spots). For example, the player sitting at the table in front of the player position may be allowed to make a wager thereon and one or more players standing behind or near the table (typically referred to as "back bettors") may also be allowed to make a wager by placing casino chips on the bet spot of the player position. In some embodiments, a single player position may be associated with multiple bet spots (e.g., for different types of available wagers or a different bet spot for the primary player and a back betting or remote player).

Irrespective of the number of bet spots associated with a player position or a number of players who can place a wager on a given bet spot, in some embodiments the image-capturing device(s) associated with the table may be operable to capture images of players, either players sitting at the table and being the primary players or back bettors standing behind or near the primary players. In some embodiments, a given image-capturing device may correspond to a single player position and/or bet spot (e.g., there may be a one-to-one correspondence between an image capturing device of a table and a player position of the table). In other embodiments, a given image capturing device may be operable to focus on more than one player position or bet spot (e.g., the image capturing device may swivel or move (or a component thereof may do so), different sectors or areas within the device's field of vision may be associated with different bet spots, player positions, player, etc.).

In previously-filed patent applications (e.g., U.S. Pat. No. 9,694,272 to Moore et al., titled RFID-ENABLED SYSTEMS FOR FACILITATING TABLE GAMES and issued on Jul. 4, 2017 (application Ser. No. 14/994,127, filed on Jan. 12, 2016), as well as U.S. patent application Ser. No. 15/813,151 to Moore et al. and titled SYSTEMS AND METHODS FOR UTILIZING RFID TECHNOLOGY TO FACILITATE A GAMING SYSTEM, filed on Nov. 14, 2017, each of the foregoing being incorporated by reference herein for all purposes and particularly for purposes of describing and enabling a table game system that includes RFID components for recognizing RFDI-enabled casino chips), Applicant has described a table operable to facilitate wagering games such as blackjack and baccarat which includes a plurality of player positions and bet spots, the table being equipped with RFID readers or antennas operable to detect placement, presence and removal of RFID casino chips by use of a computing device (with a processor and appropriate program) that is associated with the table. Such a table may, for example, include one or more RFID readers or antennas (also referred to as "sensors" herein) placed upon the table (e.g., under the felt) at each player position and at the dealer position (and/or chip tray of the dealer), operable to transmit data to a processor associated with the table. An electronic shoe operable to determine cards dealt during a wagering game may also communicate with the processor, to allow the processor to determine whether a wager results in a win for the player, how much a dealer should pay out to the player, how much a dealer should collect from the player upon a loss, etc. Each sensor may be operable to communicate to the processor when a casino chip (e.g., an RFID enabled casino chip) is detected at a particular location of the table (e.g., placed on a bet spot to indicate a wager being made), removed by a dealer due to a player loss of water, and/or provided to a player as a win resulting from a wager made by the player. In particular, U.S. patent application Ser. No. 13/513,994, filed on Jun. 5, 2012 in the name of Moore et al. and entitled METHODS AND SYSTEMS FOR FACILITATING TABLE GAMES describes a table equipped with RFID sensors which may be utilized to implement some embodiments described herein (e.g., an RFID enabled casino chip, a table equipped for sensing, tracking and storing a position of casino chips placed on the table, results of wagering games played on the table, payouts paid to player and losses collected from players, etc.). The entirety of this application, and particularly FIGS. 3-7 and the accompanying descriptions thereof (e.g., paragraphs [0098]-[0148]), are incorporated by reference herein for all purposes.

In accordance with some embodiments, a system comprising a smart table equipped with RFID sensors and a processor may be operable to access one or more databases which store (i) a respective image of each registered player in association with a unique identifier of the player; and (ii) a respective unique identifier of each casino chip associated with the player identifier. In some embodiments, such information may be stored in a single database or table while in other embodiments the information may be stored in multiple databases or tables. In some embodiments, the information may be stored locally at the table while in other embodiments a local processor of a table may be operable to retrieve or access the information from a separate server device (e.g., a server of the gaming establishment at which the table is located). In accordance with one embodiment, the identity of a player at a table game may be verified or determined when they make a buy-in and the system as described herein may be operable to identify each player at each betting round (e.g., by use of a camera or other image capturing device, facial recognition software and the data of players as described herein, such as previously obtained images of players and the casino chips associated with players). For example, in some embodiments a trend board of a table may comprise an image capturing device. The system described herein may be operable to associate the registered owner of the gaming chips with the recognized face at the table or in the back-betting crowd behind the table.

A live image of a player (i.e., an image captured in response to recognition of a qualifying activity) may be utilized in ways additional to a determination or verification of a player identity. For example, in some embodiments, the system may be operable to store a live captured photo or other image of a player (i.e., an image captured in response to recognition of a qualifying activity). While in some embodiment the live images of players may only be stored under certain circumstances (e.g., when a mismatch occurs between the identifier provided by a player placing a wager and an identifier determined for the player based on a comparison of a live image taken of the player to stored images of players in a database), in other embodiments each live image captured of a player may be stored (e.g., in association with the wager accepted from the player upon an identification of the player being determined or verified based on the captured image or in association with another type of qualifying activity). For example, an audit record of wagers accepted (and photographic evidence of the identity of the player from whom the wagers were accepted) may be kept by a gaming establishment. Such a photographic record may be useful, for example, in order to provide to a regulatory authority photographic evidence that the person making the wager is the owner of the casino chips accepted for the wager.

The present disclosure will focus on baccarat and blackjack table games as examples of games in which verifying the identity of players in accordance with some embodiments may be implemented, but it should be appreciated that similar functionality may be applied to other RFID-enabled table games such as roulette, craps, Sic Bo, Pai Gow (tile and poker variations), LET IT RIDE™, CARIBBEAN STUD™, 3-CARD POKER, 4-CARD POKER, SPANISH 21, variants of such games (e.g., Chemin de Fer), or the like.

Referring now to FIG. 1, illustrated therein is a block diagram of a system 100 that may be useful in implementing one or more embodiments described herein. The system 100 may comprise, for example, a system within a particular gaming establishment which includes a plurality of table systems (e.g., smart tables equipped with RFID interrogators) for facilitating card games, wherein at least one image capturing device such as a camera is associated with at least one of the table systems. In accordance with at least some embodiments, the system 100 includes a table game server 110 (e.g., for managing chip, player and/or game activities at one or more connected table systems as well as for capturing images of players engaged in activities at the tables) that is in communication, via a communications network 130, with one or more table systems 120. In some embodiments, the table game server 110 may comprise an image capturing server the primary function of which is to capture images of players participating in games at the table systems 120 and identifying the players based on images or templates of images of the players stored in a central database of the server.

The table game server 110 may communicate with the table systems 120 directly or indirectly, via a wired or wireless medium such as the Internet, LAN, WAN or Ethernet, Token Ring, or via any appropriate communications means or combination of communications means. Each of the table systems 120 may comprise computers, such as those based on the INTEL® PENTIUM® processor, that are adapted to communicate with the table game server 110. Any number and type of table systems 120 may be in communication with the table game server 110, although only three (3) are illustrated in the example of FIG. 1.

Communication between the table systems 120 and the table game server 110, and (in some embodiments) among the table systems 120, may be direct or indirect, such as over the Internet through a Web site maintained by table game server 110 on a remote server or over an on-line data network including commercial on-line service providers, bulletin board systems and the like. In yet other embodiments, the table systems 120 may communicate with one another and/or table game server 110 over RF, cable TV, satellite links and the like.

Some, but not all, possible communication networks that may comprise network 130 or otherwise be part of system 100 include: a local area network (LAN), a wide area network (WAN), the Internet, a telephone line, a cable line, a radio channel, an optical communications line, a satellite communications link. Possible communications protocols that may be part of system 100 include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In some embodiments, the table game server 110 may not be necessary and/or preferred. For example, at least some embodiments described herein may be practiced on a stand-alone table system 120 and/or a table system 120 in communication only with one or more other table systems 120 or a dedicated server device. In such an embodiment, any functions described as performed by the table game server 110 or data described as stored on the table game server 110 may instead be performed by or stored on one or more table systems 120 (e.g., a table system 120 may function to verify the identity of a player using locally stored logic and captured images, rather than depending on a remote server device to do so).

Figure 2A:
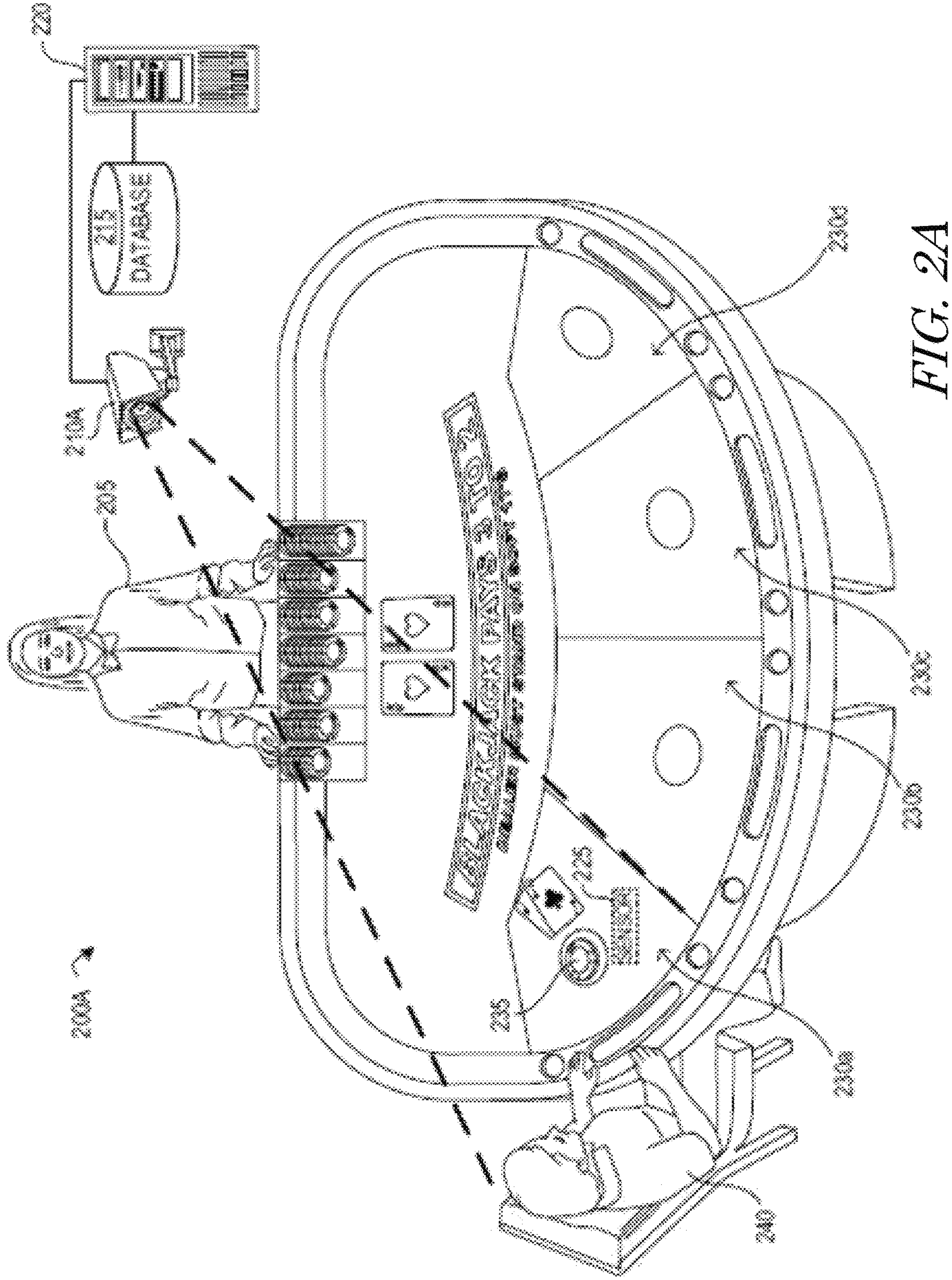
FIG. 2A illustrates a top planar view of a table associated with a camera in a gaming establishment, for facilitating some embodiments described herein.

Referring now to FIG. 2A, illustrated therein is a plan view of a system 200A which may be useful in implementing one or more embodiments described herein. The system 200A comprises a smart table (in the illustrative example it is a blackjack table but the embodiments described herein are equally applicable to other types of table games, such as baccarat, poker, roulette and pai gow). The smart table may, in accordance with some embodiments, be operated by a dealer 205 (which may be a live dealer, as illustrated, but in other embodiments can be a virtual dealer of a video table game).

The system 200A may further include at least one camera 210A. The term "camera" is used herein (whether referring to camera 210A, camera 210B of FIG. 2B or another camera described herein) to refer to an image capturing device, which may be any type of device operable to capture an image of a player (e.g., a digital image, still image, video image, computer-enhanced image, etc.). In accordance with some embodiments, the camera 210A may be mounted, attached or otherwise present near the table, such as being mounted to a wall, ceiling, post, or other surface near the table. In some embodiments, multiple cameras may be mounted or located near the table (e.g., such that an image of players at each of the player positions of the table may be obtained using such cameras). The embodiments described herein are not reliant on any particular, type, size or positioning of the at least one camera 210; the camera 210A need only be operable to capture an image of a player associated with the table system 200A.

The camera 210A may be controllable, for example, by a server or other computing device 220A. The computing device 220 may, for example, comprise a server operable to facilitate a game at the table of system 200A and/or another table. In one embodiment, computing device 220 may comprise a server of a gaming establishment which is programmed to verify and/or determine identifications of players and/or perform other functions. In one embodiment, computing device 220 may comprise a plurality of server computers working together.

The computing device 220 may be operable to access data in, or request data from, database 215 (which may comprise one or more databases). In accordance with some embodiments, the database 215 includes data, associated data structures, and database management software. The database 215 (as well as any other database described herein) may, for example, be implemented using any well-known database management systems, including Microsoft SQL, Oracle, IBM DB2, etc. It should be noted that in some embodiments, database 215 (or at least some of the data described as being stored therein) may be stored in a memory of computing device 220 and/or in another memory device accessible to the computing device 220. For example, in one embodiment database 215 (or at least some of the data described as being stored therein) may be stored in a memory of a third party server, such as a server of a cloud-based computing service with which a gaming establishment or table system 200 owner or operator may contract for purposes of storing data.

The database 215 may comprise, for example, one or more of (i) a player database which stores records of data on registered players (e.g., player identifier, player name, stored player image, player wagering history, unique identifiers of respective casino chips associated with the player, etc.); (ii) a casino chip database which stores unique identifiers for casino chips available in the wagering establishment and other information corresponding to each chip (e.g., denomination, status, player identifier associated therewith, location, usage history, etc.); (iii) a camera database storing data on one or more cameras or other image capturing devices available for capturing images of players in each wagering establishment (e.g., each camera may be associated with one or more tables and/or one or more player positions it is functional to focus on and may be associated with an IP or other unique address or identifier which allows the system 200 to determine which camera a particular image was obtained by), including status, availability, image capture history, etc.); and (iv) a wager database which stores an indication (e.g., for each table in the wagering establishment for which wagers are tracked in accordance with embodiments described herein) each wager accepted, including data such as the time/date of each such wager, the player who placed the wager, an image of the player who placed the wager, a result of the wager, the casino chips placed for the wager, etc. Of course, other data and/or databases may be used.

The table of system 200A comprises a plurality of player positions 230*a* through 230*d*. For purposes of brevity, only detail is shown and described for player position 230*a* at which player 240 is sitting. It should be understood that the other player positions 230*b* through 230*d* may be similarly laid out and utilized and that any number of player positions may be included. In some embodiments, a bet spot position may be a shared or common position, such that more than one player may use the position to place wagers and place casino chips.

Player position 230*a* includes a sensor 225 for detecting the placement of a casino chip (also referred to herein as a wagering chip or token here). Sensor 225 may comprise, for example, an RFID antenna, an RFID reader or an optical reading device (e.g., such as that described with reference to U.S. Pat. No. 6,712,696 to Soltys et al. titled METHOD AND APPARATUS FOR MONITORING CASINOS AND GAMING, which is incorporated by reference herein for all purposes). In the illustrative example of FIG. 2A, sensor 225 is shown as having a casino chip 235 placed on a bet spot of the player position 230*a* (in other embodiments and games, more than one bet spot may be included in a single player position). It should be noted that although sensor 225 is illustrated in FIG. 2A, in implementation in a casino environment the sensor 225 may not be visible or noticeable to a player (e.g., it may be located under the felt of a table or otherwise integrated into the table in a manner that renders it unnoticeable to the player). It may be assumed, for purposes of the present example embodiment, that the sensor 225 is an RFID antenna and that casino chip 235 includes an RFID transmitter or other technology which allows data about the chip (such as the unique chip identifier and/or denomination of the chip) to be transmitted to or read by the RFID sensor (in embodiments in which sensor 225 is an optical imaging sensor, the casino chip 235 may comprise optical characters or images that are readable by the sensor).

Although not shown in FIG. 2A, sensor 225 may be operable to communicate (in a wire or wireless manner) with a processor of the table, such as a processor of computing device 220. For example, sensor 225 may read the chip identifier of a casino chip placed on the bet spot of player position 230*a* and transmit the chip identifier to the processor. In accordance with some embodiments, the processor may then utilize this information to determine additional information associated with the casino chip. For example, in one embodiment the processor may utilize this information to retrieve the player identifier of the player associated with the chip.

In an example process relevant to the embodiment of FIG. 2A, upon the casino chip 235 being placed on the bet spot of player position 230*a*, the camera 210A may also be focused on an area encompassing the seat in front of player position 230*a* (the area of the table on which the camera should focus may be determined based on an identity or location of the sensor from which the chip identifier was received and/or from an indication of the player position and/or bet spot received from the sensor (if such latter information is transmitted by the sensor). For example, the camera 210A may be controlled by (i) a processor (e.g., a processor of computing device 220A or another processor), (ii) the dealer 205 and/or (iii) another employee of the wagering establishment. Controlling or directing the camera 210A may comprise, for example, directing the camera to focus on the player position at which a wager has been placed or requested (e.g., at which one or more casino chips have been placed as a wager). In some embodiments, focusing the camera 210A on the player position at which a casino chip has been placed as a wager may comprise manually swiveling or moving the camera or a component of the camera. The camera 210A may be programmed to then capture one or more live images of players at or near the player position at which casino chips have been placed as a wager (e.g., the player seated at the player position and any players standing behind the player position, if back betting is being accepted for the table). The one or more live images may then be transmitted to a computing device (e.g., computing device 220).

In some embodiments, an indication of the comparison and/or match result is stored in a database for subsequent reference. In some embodiments, if a match cannot be made (e.g., the processor, using facial recognition software, cannot match any of the faces of players captured in the one or more live images to the one or more stored images of the player associated with the chips), a warning message may be output to the dealer and/or the camera 210A or camera 210B may be repositioned to acquire another one or more live images of the players in the relevant bet spot or player position 230*a* (such that another comparison and match attempt may be performed). In some embodiments, if a match between the stored image(s) and the live image(s) cannot be made, a signal may be output to the dealer, prompting the dealer to request identification from the player who placed the casino chips on the relevant player bet spot. The dealer may thus be prompted to manually check the identity of the player who is trying to place the bet. In one embodiment, the name and/or image of the player associated with the player identifier corresponding to the chip identifier(s) may be output to the dealer. For example, if the chip identifier(s) acquired by sensor 225 are associated with a player identifier corresponding to player name "Joe Smith" and one or more images of Joe Smith, a message may out output to the dealer "This is Joe Smith" with the one or more stored images. "Please verify Joe Smith is the one who placed the bet on player position [230*a*]." The dealer may thus be trained to manually compare the image(s) in the message to the faces of the players (s)he sees at the player position and/or ask the player at the relevant player position for identification (e.g., a passport or driver's license). In one embodiment, the dealer may actuate a button or link (e.g., on a touchscreen or keyboard) to indicate that the player's identity has been verified successfully before being able to accept the wager. In some embodiments, the dealer may not be authorized to accept the wager until (s)he so indicates that (s)he has verified the player's identity (or provides evidence of the player's identity, such as scanning the player's passport, driver's license or other identity documentation into the system (e.g., so it can be stored in association with the wager information)).

Figure 2B:
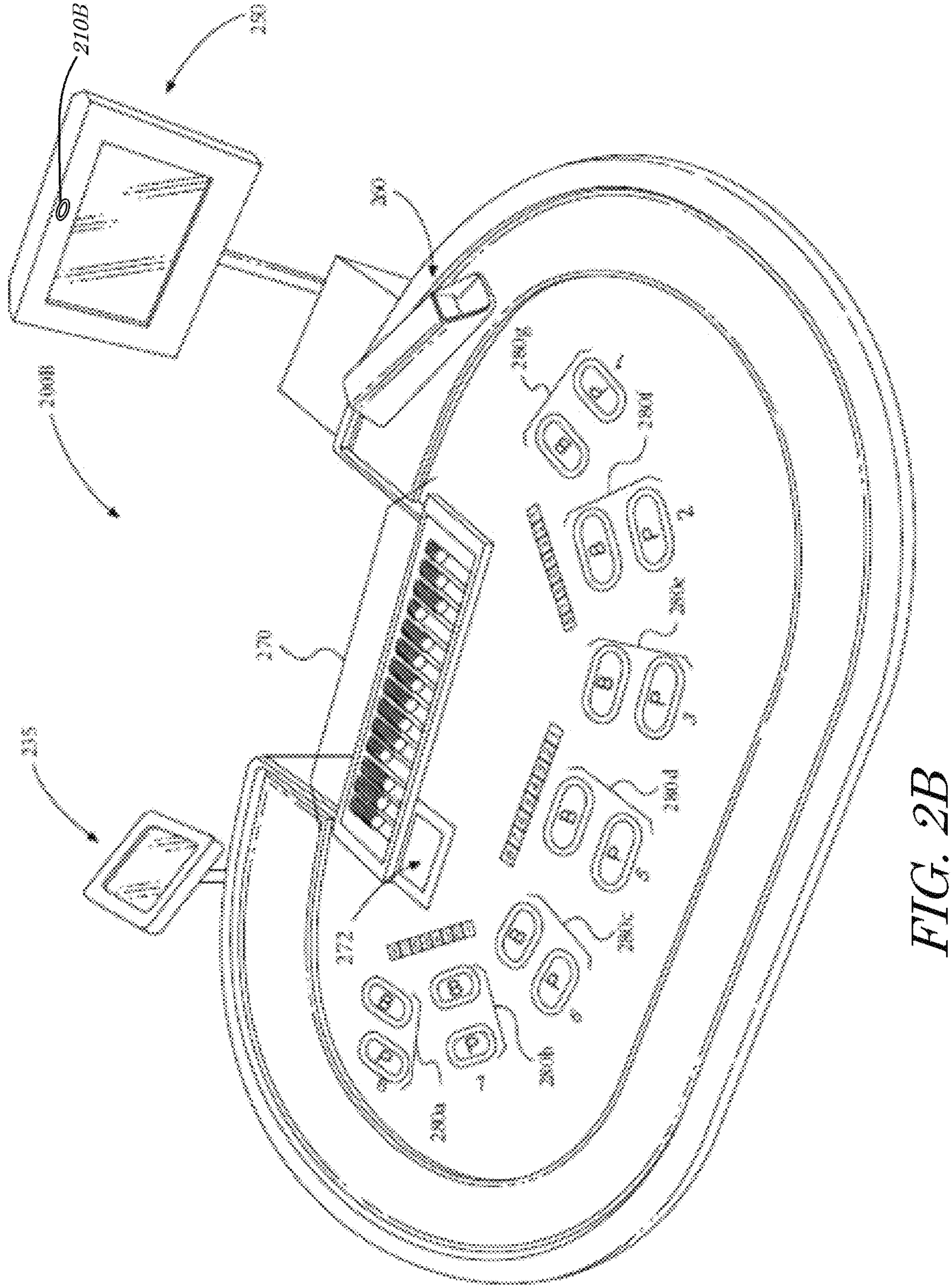
FIG. 2B illustrates a top planar view of a table in which a camera comprises a component of a trend board of the table, for facilitating some embodiments described herein.

Referring now to FIG. 2B, illustrated therein is another example embodiment of a table system 200B comprising a camera for obtaining images of players, in accordance with some embodiments described herein. In accordance with the embodiments of FIG. 2B, one or more cameras may be mounted or attached to the smart table or component thereof (e.g., such as to a trend board of the table). The table 200B includes seven (7) player positions 280*a*-280*g*, each player position including a Banker bet spot and a Player bet spot. Of course, any number of player positions may be utilized. Further, while the table 200A (FIG. 2A) and 200B (FIG. 2B) are illustrated as being configured for a game of baccarat, a different configuration may be utilized for different type of table games (e.g., a poker game, a blackjack game, a craps game or a roulette game) while still utilizing a camera 210A (FIG. 2A) or a camera 210B (FIG. 2B) for purposes of implementing at least some embodiments described herein.

The table 200B further includes a display 235 which a dealer or other gaming establishment personnel may utilize to access information regarding game events, transactions, chip tray variances or other data related to the table 200B. The table 200B further includes another display 250 which faces the players and may show data to players such as recent historical outcomes (sometimes referred to as a "trend board"). Players sometimes use such historical outcomes in an effort to predict trends within a series of game instances. In accordance with some embodiments, at least one camera 210B is mounted on or within the display 250 such that it can capture images of players placing wagers at the table (whether it be players sitting directly at any of the player positions 280*a*-280*g* or back betters standing behind such players). In accordance with some embodiments, the at least one camera 210B may be operable to swivel and/or refocus on players at or near the multiple player positions of the table. In accordance with one embodiment, the at least one camera 210B may be controlled by a processor or controller associated with the table 200B. For example, assuming the table 200B comprises system 300 of FIG. 3 (described in detail below), the camera 210B may comprise camera 358 and be controlled by processor 384.

The table 200B further includes an electronic card shoe 260 via which cards for the game are shuffled and dealt. In accordance with some embodiments, the electronic card shoe 260 may communicate with a processor (e.g., a processor of the table 200B) to communicate data regarding cards dealt and/or remaining in the shoe.

The table 200B may include additional components (at least some of which may not be easily visible to a player or other observer) such as one or more processors, a memory storing a general program and one or more specialized software applications which, in combination with data obtained from the RFID antennas located on the table, may facilitate many of the functions described herein (e.g., verifying that a casino chip placed by a player is associated with that player in a chip status database, etc.). In accordance with some embodiments, the table 200B may include one or more sensors under its felt or other covering, such as the one or more sensors 225 described with respect to FIG. 2A.

Figure 3:
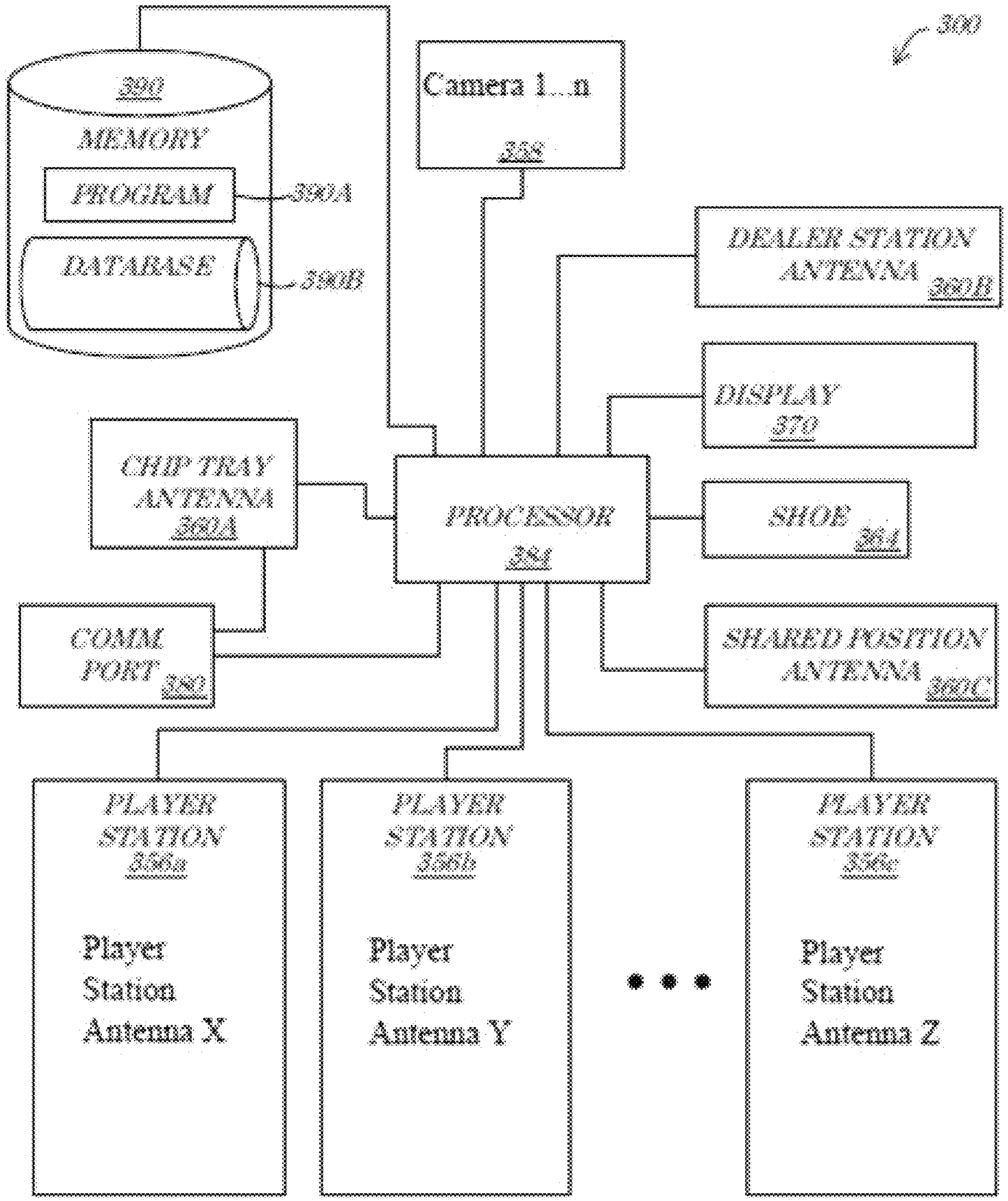
FIG. 3 illustrates a block diagram of an example table system operable to facilitate at least some embodiments described herein.

Referring now to FIG. 3, illustrated therein is a block diagram of a table system 300 consistent with some embodiments described herein. The table system 300 may comprise, for example, a table system 120 of FIG. 1 and/or at least a portion of system 200 of FIG. 2 (e.g., computing device 220). The table system 300 may be implemented as a system controller, a dedicated hardware circuit, an appropriately programmed computer which is a component or peripheral device of a table for facilitating a card game, or any other equivalent electronic, mechanical or electro-mechanical device.

The table system 300 comprises a processor 384, such as one or more INTEL® PENTIUM® processors. The processor 384 may be in communication with a memory 390 and a communications port 380 (e.g., for communicating with one or more other devices). The memory 390 may comprise an appropriate combination of magnetic, optical and/or semiconductor memory, and may include, for example, Random Access Memory (RAM), Read-Only Memory (ROM), a compact disc, tape drive, and/or a hard disk. The memory 390 may comprise or include any type of computer-readable medium. The processor 384 and the memory 390 may each be, for example: (i) located entirely within a single computer or other device; or (ii) connected to each other by a remote communication medium, such as a serial port cable, telephone line or radio frequency transceiver. In some embodiments, the table system 300 may comprise one or more devices that are connected to a remote server computer for maintaining databases.

The memory 390 may store a program 390A for controlling the processor 384. The processor 384 may perform instructions of the program 390A, and thereby operate in accordance with at least one embodiment described herein. The program 390A may be stored in a compressed, uncompiled and/or encrypted format. The program 390A may include program elements that may be necessary or desirable, such as an operating system, a database management system and "device drivers" for allowing the processor 384 to interface with computer peripheral devices (e.g., an RFID-enabled chip tray, an electronic shoe, one or more cameras and/or one or more sensors, any of which may provide data to the processor 384). Appropriate program elements are known to those skilled in the art, and need not be described in detail herein. In accordance with some embodiments, program 390A, a subroutine or module of program 390A or another program stored in memory 390 (or otherwise accessible to processor 384) may comprise instructions for applying at least some of the player identification verification functionalities described herein (e.g., detecting that a player has engaged in a qualifying activity, capturing an image of the player, comparing the images to pre-stored images or templates in a database and determining an identity of the player based on the comparing).

In accordance with some embodiments, the system 300 may comprise one or more software module(s) for directing the processor 384 to perform certain functions (which, in the simplified system illustration of FIG. 3, may be represented by program 390A). In accordance with some embodiments, software components, applications, routines or sub-routines, or sets of instructions for causing one or more processors to perform certain functions may be referred to as "modules". It should be noted that such modules, or any software or computer program referred to herein, may be written in any computer language and may be a portion of a monolithic code base, or may be developed in more discrete code portions, such as is typical in object-oriented computer languages. In addition, the modules, or any software or computer program referred to herein, may in some embodiments be distributed across a plurality of computer platforms, servers, terminals, and the like. For example, a given module may be implemented such that the described functions are performed by separate processors and/or computing hardware platforms.

With reference to FIG. 3, it should be understood that any of the software module(s) or computer programs illustrated therein may be part of a single program or integrated into various programs for controlling processor 384. Further, any of the software module(s) or computer programs illustrated therein may be stored in a compressed, uncompiled, and/or encrypted format and include instructions which, when performed by the processor 384, cause the processor 384 to operate in accordance with at least some of the methods described herein. Of course, additional and/or different software module(s) or computer programs may be included and it should be understood that the example software module(s) illustrated and described with respect to FIG. 3 are not necessary in any embodiments. Use of the term "module" is not intended to imply that the functionality described with reference thereto is embodied as a stand-alone or independently functioning program or application. While in some embodiments functionality described with respect to a particular module may be independently functioning, in other embodiments such functionality is described with reference to a particular module for ease or convenience of description only and such functionality may in fact be a part of integrated into another module, program, application, or set of instructions for directing a processor of a computing device.

According to an embodiment, the instructions of any or all of the software module(s) or programs described with respect to FIG. 3 or otherwise herein may be read into a main memory from another computer-readable medium, such from a ROM to RAM. Execution of sequences of the instructions in the software module(s) or programs causes processor 384 or another processor, as relevant, to perform at least some of the process steps described herein. In alternate embodiments, hard-wired circuitry may be used in place of, or in combination with, software instructions for implementation of the processes of the embodiments described herein. Thus, the embodiments described herein are not limited to any specific combination of hardware and software.

The term "computer-readable medium" as used herein refers to any medium that participates in providing instructions to processor 384 (or any other processor of a device described herein) for execution. Such a medium may take many forms, including but not limited to, non-volatile media, volatile media, and transmission media. Non-volatile media include, for example, optical or magnetic disks, such as memory 390. Volatile media include dynamic random access memory (DRAM), which typically constitutes the main memory. Transmission media include coaxial cables, copper wire and fiber optics, including the wires that comprise a system bus coupled to the processor 384. Transmission media can also take the form of acoustic, electromagnetic, or light waves, such as those generated during radio frequency (RF), microwave, and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Various forms of computer readable media may be involved in carrying one or more sequences of one or more instructions to processor 384 (or any other processor of a device described herein) for execution. For example, the instructions may initially be borne on a magnetic disk of a remote computer. The remote computer can load the instructions into its dynamic memory and send the instructions over a telephone line using a modem. A modem local to a table system 300 may be operable to receive the data on the telephone line and use an infrared transmitter to convert the data to an infrared signal. An infrared detector can receive the data carried in the infrared signal and place the data on a system bus for processor 384. The system bus may carry the data to a main memory, from which processor 384 may retrieve data and execute instructions. The instructions received by main memory may optionally be stored in memory 390 either before or after execution by processor 384. In addition, instructions may be received via communication port 380 as electrical, electromagnetic or optical signals representing various types of information. According to some embodiments of the present invention, the instructions of the program 390A may be read into a main memory from another computer-readable medium, such from a ROM to RAM. Execution of sequences of the instructions in program 390A may cause processor 384 to perform at least some of the functions described herein. In alternate embodiments, hard-wired circuitry may be used in place of, or in combination with, software instructions for implementation of at least one embodiment described herein. Thus, embodiments described herein are not limited to any specific combination of hardware and software.

In accordance with some embodiments, one module or sub-routine that may comprise program 390A may comprise a facial recognition module. Facial recognition software, which may be embodied as a module of program 390A, may be executed with respect to a captured image of a player (e.g., an image captured by camera 358) in order to identify the player and/or return an indication of the best matches of the image captured by the camera to stored images of players (e.g., as stored in a player database, such as that described with respect to FIG. 4B) or to verify the identity of a player placing a casino chip as a wager on a table. For example, the facial recognition software or module may be used to compare an image stored in the system in association with the player identifier associated with the casino chip to an image of a player at the player position at which the wager is being placed. As described herein, a player image matching process may be useful in some embodiments described herein, such as in embodiments in which the identity of a player placing a casino chip or wager onto a table may need to be verified prior to the wager being accepted by the dealer (e.g., such as described with respect to process 500 of FIG. 5).

The memory 390 may also store at least one database 390. Database 390 may be similar to database 215 (described with reference to FIG. 2) and may store similar data (e.g., a casino chip database, a player database, a camera database and/or a wager database). In some embodiments, some or all of the data described herein as being stored in the database 390B may be partially or wholly stored (in addition to or in lieu of being stored in the memory 390 of the table system 300) in a memory of one or more other devices, such the table game server 110 (FIG. 1) and/or a third party server, such as a cloud based server of a service with which processor 384 is operable to communicate.

The processor 384 is also operable to communicate with at least one camera 358 (which may, as described herein, comprise any type of image capturing device). In some embodiments a plurality of cameras may be associated with a given table, thus the camera 358 is identified as camera 1-n to indicate a plurality of cameras is possible.

In accordance with some embodiments, the processor 384 is operable to communicate with a display 370. The display 370 may comprise, for example, a display for displaying historical outcomes or other wagering information to players. In some embodiments, the display 370 may output a name of a player identified for a particular position, wager or activity (e.g. to provide an opportunity for correction if such identification is determined to be incorrect). In some embodiments, the display 370 (or another display of the table system 300) may also be operable to output information to a dealer, such as (i) prompts for how much should be collected from players in commission or losing wagers (e.g., for each player position involved in the hand); (ii) prompts for how much should be paid out to players for winning wagers (e.g., for each player position involved in the hand); and/or (iii) other information regarding a status of the game, including information regarding a status of one or more wagers or RFID-enabled chips being used on the table or an indication of whether a player's identity has been verified (e.g., in accordance with the process 500 or a similar process) or whether a player has been cleared for participation in the current game. In some embodiments, the display 370 may include or have associated therewith its own processor, memory and program (and may be operable to communicated data to and/or from the processor 384). In some embodiments the display 370 may comprise, for example, one or more display screens or areas for outputting information related to game play on the gaming system, such as a cathode ray tube (CRT) monitor, liquid crystal display (LCD) screen, a light emitting diode (LED) screen and/or a touch screen.

As described herein, in some embodiments an RFID-enabled chip tray may comprise one or more antennas for reading information from RFID-enabled chips placed in the chip tray. In such embodiments, the processor 384 is further operable to communicate with the one or more chip tray antenna(s) 360A. The one or more antenna(s) 360A may be operable to read data from one or more chips placed within a chip tray (e.g., chip identifier, chip set identifier, chip denomination, etc.) and transmit this information to the processor 384.

The processor 384 is further operable to communicate with a shared position antenna 360C, which comprises at least one antenna on a shared or common betting area for recognizing chips placed (and removed from) the shared or common betting area. In some embodiments, the processor may receive from an antenna 360 data regarding chips placed on a common betting area and determine, based on this data and additional data stored in memory (e.g., a player identifier or last player position associated with the chip that has now been acquired at the shared position antenna 360C) that a particular bet has been made by a particular player or for a particular player position and to determine whether any such chip is a selected chip. The identifier of the player may be determined, in accordance with some embodiments, by capturing an image of the player and comparing the image to pre-stored images or templates using facial recognition technology. Of course, a shared position antenna or shared or common betting area is not necessary for all embodiments and the systems and processes described herein are not limited to tables which include shared or common betting areas.

The processor 384 is further operable to communicate with a plurality of antennas at player positions placed on the table. The table system 300 illustrates three player positions 356 (356*a*, 356*b* and 356*c*) as each having at least one player position antenna or interrogation (X, Y and Z) associated therewith. Each such antenna X, Y and Z may be uniquely identifiable by, for example, (i) a unique identifier associated therewith, and (ii) an identification of a port or other component of the table associated with the antenna (e.g., the port into which the antenna is plugged into may have a unique identifier associated therewith) and such unique antenna identifier may be transmitted to or recognized by the processor 384 when chip information regarding a chip acquired by a respective antenna is transmitted to the processor 384, such that the processor 384 may be programmed to determine information such as which player position and which betting area within the player position the chip has been placed within. In some embodiments, a single player station 356 may include interrogators associated with two or more players. For example, one interrogator may be intended for a first player playing the game at the table and another interrogator for a second player (e.g., a "back bettor") who may be betting along with or in association with the first player, either remotely or from essentially the same location, but whose chips and betting activity is to be separately tracked. In some embodiments, a chip status database may be part of the system and store detailed data with information regarding chips which have been identified (e.g., by a remote server device) as selected chips and utilize the information in this database to determine whether any of the chips detected at the table comprise selected chips identified in the database.

In some embodiments, receiving or detecting a placement of a wager or another qualifying activity by a player station antenna may cause a camera or other image capturing device to be focused on (or to be directed by a processor associated with the camera to so focus on) the players near or in front of that player station, in order to identify the player placing the wager or otherwise engaging in a qualifying activity. For example, a camera database such as that store in database 390B may store an indication of which sensor is associated with which player position (e.g., based on a port or other identifier of the sensor that is transmitted to the processor, along with an indication of a chip identifier or an indication of a detected chip placement, by the detecting sensor). In accordance with some embodiments, the camera database may further store an indication of one or more cameras that are associated with (e.g., operable to capture an image of a player placing a bet on) the player position corresponding to the sensor that provided the indication of the chip placement.

In one embodiment, there may be a one-to-one correspondence of camera to player position (e.g., each player position may have a dedicated at least one camera for capturing images of players at that player position). In such embodiments, the processor 384 or another processor may direct the camera (or one of the cameras, if more than one) to activate and capture an image of a player upon determining that a chip has been placed at the corresponding player position. In other embodiments, a camera associated with a given player position may continuously capture images of players at the player position but, upon a processor determining that a chip has been placed at the player position or another qualifying activity has occurred at the player position, the processor may direct the camera to store, process and/or transmit one or more player images captured at approximately at the time of the chip placement, such that a process such as a player identity verification process (e.g., process 500) or other process regarding the image may be performed.

In other embodiments, a given camera may have the ability to capture images of players at multiple player positions, in which embodiments the processor 384 or another processor may direct the camera as to which particular player position it is to focus on and capture a player image for at any given time. Thus, upon receiving data indicating a newly identified chip placement at a particular player position, processor 384 or another processor may determine which camera of a plurality of camera operable to capture images of players at that particular player position is available and direct it to focus on that player position and capture an image of a player. The camera may then further be directed to (or programmed to) transmit the captured image such that a process such as player identity verification process (e.g., process 500) or other process regarding the image may be performed.

The processor 384 is further operable to communicate with an electronic shoe 364. The shoe 464 may be an intelligent shoe such as the IS-T1™ and IS-B1™ or the MD1, MD2 sold by SHUFFLE MASTER or other such devices. The shoe 364 may be able to determine which cards are being dealt to which player station, through RFID technology, image recognition, a printed code on the card (such as a barcode), or the like. The embodiments described herein are not dependent on any particular technique used to recognize cards dealt in a card game (or cards remaining as available to be dealt). Further information about intelligent shoes may be found in U.S. Pat. Nos. 5,941,769 and 7,029,009, both of which are incorporated by reference in their entireties and U.S. Patent Application Publications 2005/0026681; 2001/7862227; 2005/0051955; 2005/0113166; 2005/0219200; 2004/0207156; and 2005/0062226 all of which are incorporated by reference in their entireties. In place of an intelligent shoe, cameras may be used with pattern recognition software to detect what cards have been dealt to what player stations and what chips have been wagered at particular player stations. One method for reading data from playing cards at table games is taught by German Patent Application No. P44 39 502.7. Other methods are taught by U.S. Patent Application Publication 2007/0052167 both of which are incorporated by reference in their entirety. In some embodiments, the table 300 may comprise an electronic table in which virtual representations of cards are dealt rather than physical cards. In such embodiments, an electronic show may not be desired and each player station may include a respective electronic display for displaying the electronic cards dealt to a player.

The processor 384 is further operable to communicate with a dealer station antenna 360B, which comprises one or more antennas placed in a dealer area of the corresponding table. The dealer station antenna 360B may be operable to detect RFID-enabled chips which have been placed within its acquisition area, such as chips the dealer places in the area for recognizing by the system prior to placing them into the dealer tray or paying them to a player.

Referring now to FIG. 4A, illustrated therein is an example of a casino chip database embodied as table 400A. Table 400A may comprise at least a portion of, or represent data stored in, a casino chip database such as may comprise database 390B (FIG. 3) and/or database 215 (FIG. 2). In accordance with some embodiments, the casino chip database 390B may store chip identification and/or description data (e.g., denomination, unique chip identifier, chipset identifier, gaming establishment identifier, chip value, player identifier associated with chip identifier, validity of chip, chip status, player or player position with whom a particular chip or chip set is associated with, etc.) for one or more selected casino chips. In accordance with some embodiments, such data may be utilized in implement one or more embodiments described herein (e.g., aspects of process 500).

The examples of types of data associated with casino chips illustrated as stored in database 400B include (i) a chip identifier 402 (defining a unique identifier corresponding to each respective casino chip authorized or available for use in a gaming establishment); (ii) a corresponding player identifier (defining a unique player identifier corresponding to a given chip; this type of data may not be necessary or desired in all embodiments but may be useful for embodiments such as those described with reference to FIG. 5); and (iii) a denomination 406 (indicating a denomination or value of the corresponding chip). In the non-limiting embodiment of FIG. 4A, table 400A illustrates that three casino chips, with the respective chip identifiers of "C-1023-34", "C-2038-55" and "C-3928-74" are currently associated with the player uniquely identified as "P-001" and that two casino chips, with the respective chip identifiers of "C-3947-32" and "C-3949-21" are associated with the player uniquely identified as "P-002."

It should be noted that while table 400A, as well as table 400B (FIG. 4B) and table 400C (FIG. 4C) illustrate some logical associations which may be made in a system via use of one or more databases but none of them necessarily represent a single database table. For example, the chip denomination may be held in the same or a separate table with other chip information and may be linked to the data in table 400A by the casino chip identifier (chip ID). It should further be noted that the chip database may include additional data for each chip identified therein that is not illustrated in the simple table 400A (e.g., chip set identifier, chip wagering history, gaming establishment identifier, status or validity of chip, etc.). Further, although only five (5) example rows or records, each defining a particular casino chip, are illustrated in table 400B, it should be understood that a casino chip database such as the example one illustrated in FIG. 4A may comprise any number of records.

Turning now to FIG. 4B, illustrated therein is an example of a player database embodied as table 400B. Table 400B may comprise at least a portion of, or represent data stored in, a player database such as may comprise database 390B (FIG. 3) and/or database 215 (FIG. 2). In accordance with some embodiments, the player database 400B may store a number of records (illustrated as rows in the table 400B), each record storing data descriptive of, or associated with, or defining a player associated with at least one gaming establishments (e.g., data associated with players who have registered to play at a gaming establishment or players who have had gaming restrictions placed on them by a gaming establishment). In accordance with some embodiments, such data may be utilized in implement one or more embodiments described herein (e.g., aspects of process 500).

The examples of types of data associated with players illustrated as stored in database 400B include (i) player identifier 410, which may comprise a unique identifier of a player who has registered with a gaming establishment or operator or who has otherwise previously been uniquely identified by the gaming establishment or operator; (ii) a player category 412, which may comprise a rating, categorization, level, ranking or information otherwise indicative of a player's play history with the casino establishment or operator; (iii) contact information 414, which may store information allowing the gaming establishment or operator to contact the player (e.g., an e-mail address, telephone number and/or mailing address); and (iv) image data 416, which may comprise one or more image files, photos or facial feature indicators (or a link to, or address of, a location at which such are stored), which comprises data that may allow the gaming establishment or operator to determine, by comparing newly acquired images of a player, whether the player is (or is likely to be) the player of a corresponding record (e.g., based on a player identifier associated with a casino chip recently placed on a table). In the embodiment of table 400B the image data 416 is depicted as comprising a jpg file but other image file formats may be used and supported.

In one embodiment, the image data may comprise one or more of: (i) a photo of the player from an identifier previously provided by the player to the gaming establishment (e.g., a passport photo); (ii) a photo of the player taken by personnel of the gaming establishment (e.g., one or more photos of the player may be taken when the player registers as a member of the gaming establishment's player club or similar account); and (iii) a template file for the player created based on multiple images of the player taken while the player has visited the gaming establishment (e.g., via security cameras or cameras of table systems such as table system 100 of FIG. 1 or system 200 of FIG. 2).

In some embodiments, additional data regarding players may be stored in a player database. Examples of such data include, without limitation, wagering history or play data (e.g., average wager, preferred game, frequency of play, date of last visit to the gaming establishment), available bonuses and/or progress in one or more games, preferences, points or rewards earned, etc. Although only five (5) example rows or records are illustrated in FIG. 4B, each defining a particular player, it should be understood that a player database such as the example one illustrated in FIG. 4B may comprise any number of records.

Turning now to FIG. 4C, illustrated therein is an example of a camera database embodied as table 400C. Table 400C may comprise at least a portion of, or represent data stored in, a camera database such as may comprise database 390B (FIG. 3) and/or database 215 (FIG. 2). In accordance with some embodiments, the camera database 400C may store a number of records (illustrated as rows in the table 400C), each record storing data descriptive of, or associated with, or defining a camera associated with at least one table system of a gaming establishment or gaming operator (e.g., data associated with cameras available to capture images of players placing wagers on tables or otherwise involved in a qualifying activity). In accordance with some embodiments, such data may be utilized in implement one or more embodiments described herein (e.g., aspects of process 500).

The examples of types of data associated with cameras illustrated as stored in database 400C include (i) camera identifier 422, which may comprise a unique identifier of a camera available for capturing at least one image of a player gaming establishment or operator or who has otherwise previously been uniquely identified by the gaming establishment or operator; (ii) a table identifier 424, which may comprise a unique identifier of a table or table system that the corresponding camera is associated with, such that it is operable to capture images of players placing wagers or otherwise engaging in qualifying activities at such tables (it should be noted that although a single table identifier is represented in each record of table 400C, in other embodiments a given camera may be associated with multiple tables; and (iii) player position data 426, which indicates which player positions (indicated as numerals 1-n) of a corresponding table that the corresponding camera is able to focus on or capture player images for. In accordance with some embodiments, a signal or information received from a camera may include a camera identifier, a table identifier and/or a position identifier in association with a captured player image, thus enabling the system to determine which particular table and player positon a particular player image was capture at. In accordance with some embodiment, a table system may utilize the data in table 400C to identify a particular camera and direct it to capture an image (e.g., the system may identify which camera is available for capturing an image of a player at a particular player positon of a particular table at which a new wager has been detected, in order to verify the identity of the player placing the wager). For example, if the system were to determine that an image of a player at position 6 of table T001 is to be captured, the system may utilize table 400C to identify camera CA-74829 as the appropriate camera and may proceed to instruct camera CA-74829 to capture an image of the player who has just placed a new wager on this position. It should be noted that a camera database may, in some embodiments, store additional data, such as a current status or availability of a given camera, a make/model of a given camera, etc.

Applicant provides herein a system for a gaming establishment (or an entity assisting a gaming establishment) which utilizes at least some of the various player data described above to verify an identity of a player who is attempting to place a wager (e.g., at a table game) of the gaming establishment or is requesting to purchase, cash-in, redeem or otherwise utilize casino chips in the wagering establishment. For example, in some embodiments the image(s) or biometric identification of the player stored in association with the player identifier and the casino chip identifiers stored in association with the player identifier (whether stored in the same or separate databases) may be utilized to verify in an efficient manner an identity of the player placing a uniquely identifiable casino chip on a table as a wager. It should be noted that embodiments described herein are not dependent on uniquely identifiable casino chips being utilized, verifying an identity of a player as described herein may be applied to any type of activity a player is participating in that requires verification of player identity, whether this involves a uniquely identifiable casino chip, another type of casino chip or another type of activity.

Figure 5:
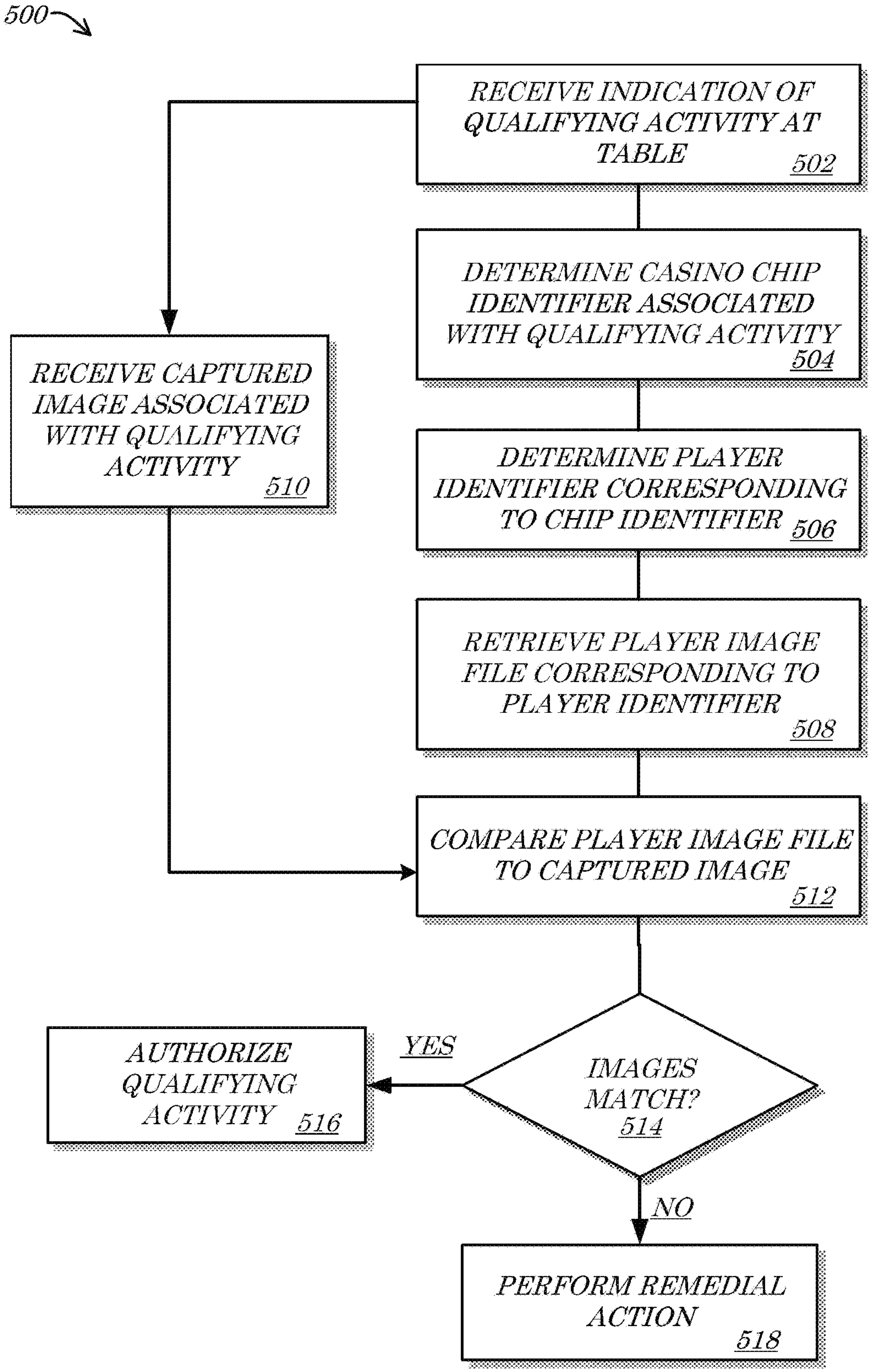
FIG. 5 illustrates an example process consistent with some embodiments described herein.

Referring now to FIG. 5, illustrated therein is an example process 500 that is consistent with some embodiments of the present invention. It should be noted that additional and/or different steps may be added to those depicted, not all steps depicted are necessary to any embodiment described herein and the steps may be performed in a different order in some embodiments. Process 500 is but one example process of how some embodiments described herein may be implemented, and should not be taken in a limiting fashion. A person of ordinary skill in the art, upon contemplation of the embodiments described herein, may make various modifications to process 500 without departing from the spirit and scope of the embodiments in the possession of applicant.

Referring now to FIG. 5 in particular, illustrated therein is an example process 500 that may be performed by one or more systems or processors described herein (e.g., by a table system 120 or table game server 110 of FIG. 1, computing device 220 of system 200 of FIG. 2 and/or processor 484 of FIG. 3). The example process 500 may be initiated, for example, upon a sensor of a table transmitting an indication that a casino chip has been placed on a bet spot of the table (e.g., upon the sensor detecting the placement). In some embodiments, the process 500 is initiated only when a new wager is detected (e.g., not in instances where an additional casino chip is added to an existing wager) or a new wagering session is recognized as having been initiated by a player (e.g., when a new player sits down to play at a given table). In some embodiments, as described herein (e.g., with reference to step 502), a preliminary process or step(s) to determine whether an activity or event is a qualifying activity that should cause process 500 (or a similar process) to be initiated may be performed.

In the example process 500, upon identifying or recognizing a qualifying activity (e.g., identifying that a casino chip has been placed at a table position, that a new player has initiated a wagering session or that a new wager has been initiated), including a unique chip identifier of a casino chip associated with the qualifying activity from a sensor such as sensor 225 (FIGS. 2A and 2B), a processor (e.g., a processor of computing device 220) may access database 215 to determine (e.g., from a player database or a casino chip database) the player identifier currently associated with the casino chip identifier. The processor may then retrieve a stored image of the player identified by the player identifier (e.g., the stored image corresponding to the player identifier in a player database), identify a captured image of a player believed to be associated with the qualifying activity (e.g., an image of a player at the player position associated with the qualifying activity at approximately the time of the qualifying activity) and compare the captured image to the stored image retrieved from the database.

In accordance with some embodiments, the system may utilize a casino chip database such as illustrated in table 400A, a player database as illustrated in table 400B and a camera database such as illustrated in table 400C to determine or verify an identity of a player placing a wager on a table upon a new wager (e.g., by means of detecting a new casino chip being placed on the player position). To illustrate the example steps of process 500, reference will occasionally be made to tables 400A (FIG. 4A), 400B (FIG. 4B) and 400C (FIG. 4C).

Turning now to FIG. 5, process 500 may begin with determining that a qualifying activity has occurred or receiving an indication of a qualifying activity. As described herein, a qualifying activity may comprise any activity of a player or with respect to a player that triggers a player identity verification process to be initiated. In accordance with some embodiments, a qualifying activity may comprise at least one of: (i) a new wager being placed on a given table (e.g., not an additional casino chip being added to an existing wager, but a new wager based on a new game event for which betting has been opened); (ii) a new wagering session having been begun by a player (e.g., a player begins a new wagering session at a given table by placing his first wager on that table or buying in to that table or a player begins wagering for the first time on a given day or within another unit of time); (iii) a casino chip has been detected as being placed/wagered on a table; and (iv) a dealer or other casino personnel has requested the player identification process for a given player or event (e.g., in embodiments in which a player identification process is a manually requested process that is initiated by casino personnel).

In accordance with some embodiments, a preliminary or different process or sub-routine may be performed, as part of step 502 or prior to step 502, to determine whether a detected event comprises a qualifying activity. For example, in embodiments in which the player identification process is performed upon the initiation of each new wager or each new wagering session (but not for each casino chip placed), such a preliminary sub-routine may comprise determining whether a casino chip that has been detected as being placed as a wager on a table comprises a new wager or is part of a new wagering session. For example, the sub-routine may comprise determining whether this is the first casino chip placed on a particular player position (the player position on which the casino chip has been detected) since wagering opened for a given hand or other game event. In another example, the sub-routine may comprise determining whether the casino chip is associated with a player identifier for which corresponding player the identity has already been verified (e.g., at the same table, for the same wagering session, on the same day, as applicable based on the embodiment being implemented). In one embodiment, a preliminary process of determining whether a detected event or data comprises a qualifying activity is performed by a first processor (e.g., a local processor of a table at which the detected event or data has been detected) while at least some of the other steps of process 500 are performed by another processor (e.g., a processor of a table game server which communicates with a plurality of tables).

Assuming it has been determined (whether by the same processor performing step 502 or a different processor) that a qualifying activity has occurred and an indication of this qualifying activity has been received in step 502, a casino chip identifier corresponding to this qualifying activity is received in step 504. In some embodiments, the casino chip identifier may be received as part of the indication received in step 502. For example, a signal from a table or component of a table (e.g., an RFID antenna of a table) may be received, indicating that a new casino chip has been detected as being wagered on the table, and the signal may include the unique casino chip identifier of the detected casino chip. In some embodiments, multiple casino chip identifiers may be received in step 504 (e.g., if a stack of casino chips has been detected) and the remainder of process 500 may be performed with respect to one, some or all of the casino chip identifiers so received.

In some embodiments, the information received regarding the qualifying activity (in either step 502 or step 504) may further include additional information. Such additional information may comprise, for example, one or more of the following: (i) an identifier of a table at which the qualifying activity was identified; (ii) more granular information as to a player position or location of the qualifying activity (e.g., which bet spot or player position of a table the qualifying activity is occurring on); (iii) an identifier of a sensor (e.g., an identifier of an RFID antenna) that detected or read the casino chip identifier of the casino chip; and (iv) a time at which the qualifying activity was detected (e.g., in hours, minutes and seconds). In accordance with some embodiments, the player position and/or bet spot information may be utilized, for example, to determine where to focus the camera 210A (FIG. 2A) or 210B (FIG. 2B). In some embodiments, as described herein, each player position or bet spot may be associated with a particular camera. In such embodiments the information received in step 502 or 504 may further include a camera identifier of the camera associated with a player position or bet spot at which the qualifying activity is occurring.

In step 506, the player identifier corresponding to the casino chip identifier received in step 504 is determined. This may comprise, for example, accessing a casino chip database that stores records indicating an association between casino chip identifiers and player identifiers (e.g., to show which player identifier a given casino chip is currently associated with, which casino chip database may be updated based on wager activity of the casino chip). For example, a casino chip database such as the table 400A illustrated in FIG. 4A may be accessed and, using the casino chip identifier, the corresponding player identifier is retrieved.

In step 508, an image file (e.g., a stored image) for the player corresponding to the player identifier determined in step 506 is retrieved (e.g., retrieved from a local or requested and received from a remote memory). In accordance with some embodiments, step 508 may comprise retrieving the image file from a player database such as table 400B described with respect to FIG. 4B.

As described herein, a stored image is an image of a player that is associated with a player identifier in a memory and has been obtained by the gaming establishment prior to the detection of the qualifying activity. In some embodiments, the system may capture an image of the player when the player first buys in for a wagering session at a table or buys chips at a cage or other casino location (e.g., the image may comprise a scan of a photo identification document provided by the player, such as a passport or driver's license, or an image taken of the player at the time of the buy-in taken by a camera of the system). This image may then be stored and referred to as a stored image, for purposes of some pre-determined period of time or event (e.g., for the duration of the player's wagering session at a table, for the rest of the day, etc.). Thus, in some embodiments, different stored images may be stored in association with a player identifier at different times (e.g., a new player image may be obtained and stored for a given player each time the player buys new casino chips or buys into a wagering session for a table). Further, in some embodiments different stored player images may be stored for the same player, each associated with different casino chips that the player has purchased, won or otherwise obtained. In other embodiments, a single stored image may be obtained for a player and stored in association with the player identifier of that player in a player database (e.g., as part of the player profile or record maintained by the gaming establishment), although this stored image may be replaced or updated from time to time. It should be understood that a stored image, regardless of how often or where it is stored, may comprise a plurality of stored images.

Retrieving the stored image may comprise retrieving it from a local database of a table system or retrieving it from a remote memory or computing device (e.g., from a remote server). As described herein, in some embodiments a stored player image may be stored in a player database such as that described with respect to FIG. 4B (which may be stored at a central server or data storage device accessible to all participating table systems). In other embodiments, the stored image may be stored in a local database stored in a memory of the table at which the player is playing (e.g., for the duration of the player's session at that table). For example, in embodiments in which a stored player image is obtained at the table upon a player first buying into a wagering session at the table, a local and temporary stored image may be obtained by having the player present a physical photo identification document and capturing an image from this document for use as a stored image for purposes of the current wagering session or by capturing an image of the player using a camera 210A or 210B and using this image as a stored image for purposes of the wagering session.

In step 510 (which may be performed simultaneously or in parallel with at least some other steps of process 500, such as any of steps 502-508), a captured image of a player associated with the qualifying activity for which an indication was received in step 502. In some embodiments, the captured image may be received as part of the indication received in step 502. The captured image may comprise, for example, an image of one or more players sitting at (or standing behind) the player position at which the qualifying activity is occurring, taken at or substantially at the time the qualifying activity was detected. For example, the captured image may comprise an image taken by camera 210A (FIG. 2A) or 210B (FIG. 2B) operable to capture images of players at or near the table position or bet spot corresponding to the qualifying activity. In some embodiments, the captured image may have been captured automatically upon the qualifying activity having been detected (e.g., a sub-routine that identifies the qualifying activity may also cause an image to be captured or images may continuously be captured and the appropriate image need only be retrieved based on a time stamp associated with the qualifying activity). In some embodiments, a processor (e.g., the processor performing process 500) may, as part of process 500, direct a camera to capture an image. For example, a processor may determine the player position or bet spot associated with the qualifying activity (e.g., based on a location indication or sensor identifier corresponding to the indication of the qualifying activity or the sensor identifier that had detected the casino chip identifier of the casino chip involved in the qualifying activity), identify a camera associated with that player position or bet spot (e.g., using a camera database such as that illustrated and described with respect to FIG. 4C) and direct or otherwise cause this camera to capture an image of the player.

It should be noted that, in accordance with some embodiments, multiple players may appear in a captured image. In such embodiments, at least some of the steps of process 500 may be performed with respect to each of the players appearing in the captured image or at least a plurality (if not all) of such players. For example, the following step 512 may be performed for a plurality, or all, of the players appearing in the image. In some embodiments, a sub-routine may be performed to determine which, if not all, of a plurality of players step 512 should be performed for. For example, step 512 may only be performed with respect to players whose entire face appears in the image (or whose face is sufficiently in focus).

It should be understood that receiving a captured image in step 510 may comprise receiving a plurality of captured images. In embodiments in which a plurality of captured images are received, step 512 may be performed for some or all of such images. For example, step 512 may only utilize those images that are of sufficient quality or only continue to utilize additional images until a Yes conclusion is obtained with respect to step 514.

In step 512 and in accordance with some embodiments, a player identity may be verified or determined by comparing the one or more live or captured images determined in step 510 to the one or more stored images retrieved based on the player identifier in step 508. In accordance with some embodiments, a program of the system 200 may be operable to compare the faces of players in the one or more live images to determine whether any of those faces match the face of the player in the stored image retrieved earlier in the process (the stored image of the player associated with the casino chips in the database).

In step 514 it is determined whether there is a match or at least a match of at least a predetermined certainty, such as a 95% match). In some embodiments, step 514 may comprise a continuous or iterative process that attempts to find a match between the stored image and any of the faces in any of the captured images (e.g., in an embodiment in which more than one captured image is received and/or at least one of the captured images includes more than one player's face).

If it is determined, in step 514, that there is a match (or at least a match of at least a predetermined certainty), the process proceeds to step 516. In step 516, the qualifying activity determined in step 502 may be authorized (e.g., if the qualifying activity comprises a wager that a player is attempting to make, the wager may be authorized or determined to be legitimate). In other words, the casino chip(s) identified (e.g., detected by the sensor 225) are determined as being wagered by the player who is associated with the casino chips in a player database and the system is satisfied that is has determined the identity of the player who is making the wager. Authorizing the qualifying activity (e.g., the wager) may comprise, in some embodiments, not doing anything further and discontinuing process 500 (although in some embodiments an additional step of storing the at least one capture image received in step 510 in association with an indication of the qualifying activity determined in step 502 may be performed, such as to allow subsequent auditing).

In some embodiments, authorizing the qualifying activity that comprises a wager may comprise allowing the wager to be booked or accepted by the dealer (e.g., a signal may be transmitted to a dealer, such as via a dealer display of the table, indicating to the dealer that the corresponding wager may be booked because the player making the wager has been identified). In some embodiments, a dealer may not be authorized to accept a wager until the identity of the player making the wager has been verified (e.g., until a match of the captured image(s) and the stored image(s) is positively completed and a verification signal is output to the dealer (e.g., via a dealer screen of the table)).

If, on the other hand, a match between the at least one stored image(s) and the at least one capture image(s) is not successful, the process 500 may proceed to step 518. In step 518 a remedial action may be performed, directed or initiated. For example, in one embodiment a remedial action may comprise outputting a signal to the dealer of the table corresponding to the qualifying activity, indicating the lack of a successful match (and therefore the inability of the system to automatically determine the identity of the player making the wager or otherwise participating in the qualifying activity). This signal may, in some embodiments, further cause the dealer to physically verify the identity of the player by requesting that the player provide a photo identification document (e.g., a passport, driver's license or gaming establishment photo identification card). The dealer may, in some embodiments, be required to provide an input to the system that he/she has physically verified the identity of the player (and, in some embodiments, provide evidence of this, such as by scanning the photo included on the photo identification document provided by the player). In some embodiments, the remedial action of step 518 may simply comprise storing an indication of the lack of a match (and thereby the lack of obtaining an identity of the player) in a memory of the system. In some embodiments, the remedial action may comprise storing the at least one capture image(s) in association with an indication of the qualifying activity. The remedial actions described herein are not mutually exclusive (i.e., more than one may be performed or implemented).

In some embodiments, rather than employing an automatic matching of the images using facial recognition software, the dealer and/or another wagering establishment employee may be provided with a copy of the stored image of the player associated with the chips and asked to look at the player who placed the wager and verify that the player matches the stored image (in which embodiment the camera 210A or camera 210B may not be utilized or may only be utilized to capture and store a live image of the player position at the time of the wager for subsequent audit purposes but not to facilitate any automatic comparison of the live image(s) to the stored image(s)).

Certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Although several embodiments, examples and illustrations are disclosed herein, it will be understood by those of ordinary skill in the art that the invention(s) described herein extend beyond the specifically disclosed embodiments, examples and illustrations and includes other uses of the invention(s) and obvious modifications and equivalents thereof. The terminology used in the description presented herein is not intended to be interpreted in any limited or restrictive manner simply because it is being used in conjunction with a detailed description of certain specific embodiments of the invention(s). In addition, embodiments of the invention(s) can comprise several novel features and it is possible that no single feature is solely responsible for its desirable attributes or is essential to practicing the invention(s) herein described.

Throughout the description herein and unless otherwise specified, the following terms may include and/or encompass the example meanings provided in this section. These terms and illustrative example meanings are provided to clarify the language selected to describe embodiments described herein and, accordingly, are not intended to be limiting. Other terms are defined throughout the present description.

A "game", as the term is used herein unless specified otherwise, may comprise any game (e.g., wagering or non-wagering, electronically playable over a network) playable by one or more players in accordance with specified rules. "Gaming" thus refers to play of a game.

A "wagering game", as the term is used herein, may comprise a game on which a player can risk a wager or other consideration, such as, but not limited to: poker games, blackjack, baccarat, craps, roulette, etc. A wager may comprise a monetary wager in the form of an amount of currency or any other tangible or intangible article having some value which may be risked on an outcome of a wagering game. "Gambling" or "wagering" refers to play of a wagering game. The terms "bet" and "wager" are used interchangeably herein.

The terms "information" and "data", as used herein unless specified otherwise, may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

The term "indication", as used herein unless specified otherwise, may refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

The term "player," as used herein unless specified otherwise, may refer to any type, quantity, and or manner of entity associated with the play of a game. In some embodiments, a player may comprise an entity (i) conducting play of a table game, (ii) that desires to play a game (e.g., an entity registered and/or scheduled to play and/or an entity having expressed interest in the play of the game—e.g., a spectator), and/or (iii) a back bettor. In some embodiments, a player may comprise a user of an interface (e.g., whether or not such a player participates in a game or seeks to participate in the game), such as a user of a table game interface or screen or mobile computing device associated with a table game.

What is claimed is:

1. A controller for verifying an identity of a player participating in a qualifying activity at a gaming establishment, the controller being operable to communicate with at least one electronic table system operable to facilitate a wagering game comprising a card game, wherein the at least one electronic table system comprises (i) at least one game area corresponding to a detecting component operable to detect data relating to a casino chip placed within the respective player area and (ii) at least one camera operable to capture an image of a player participating in the qualifying activity at one of the game areas;

the controller comprising:

a processor; and a memory storing a program for directing the processor, the processor being operable with the memory to:

(a) receive an indication of a qualifying activity occurring at the at least one electronic table system, wherein the indication includes a unique casino chip identifier of at least one casino chip associated with the qualifying activity, the casino chip identifier having been detected by the detecting component of the at least one electronic table system, wherein the qualifying activity comprises use of the casino chip in association with one of a live or future wagering activity by the player at the at least one electronic table system;

(b) retrieve, from a memory, a unique player identifier of a player associated with the casino chip;

(c) identify a previously stored image of a player associated with the player identifier, wherein the previously stored image corresponds to an official government-issued identification document that the player had presented to a gaming establishment in order to verify identity;

(d) receive, from the at least one camera of the at least one electronic table system, at least one live image of the player participating in the qualifying activity;

(e) compare, using facial recognition software, the at least one live image to the stored image to determine whether the player in the stored image is the player in the live image;

(f) only if it is determined that the player in the stored image is the player in the live image: (i) determine that the player participating in the qualifying activity is the player corresponding to the unique player identifier, thereby verifying an identity of the player participating in the qualifying activity and (ii) authorize the qualifying activity; and (g) if it is not determined that the player in the stored image is the player in the live image, perform a remedial action.

2. The controller of claim 1, wherein the qualifying activity comprises placement of the casino chip on the respective player area of the electronic table system.

3. The controller of claim 1, wherein the qualifying activity comprises an initiation by the player of a new wagering session.

4. The controller of claim 1, wherein the official government-issued identification document comprises at least one of a passport, a residency confirmation and a driver's license.

5. The controller of claim 1, wherein the remedial action comprises storing an indication of a lack of a match between the stored image and the live image.

6. The controller of claim 1, wherein the remedial action comprises directing the at least one camera associated with the electronic table system to obtain a new live image of the player associated with the qualifying activity and repeating steps (e) through (g) using the new live image as the live image.

7. The controller of claim 1, wherein the remedial action comprises transmitting a signal to a dealer of the electronic table system, directing the dealer to verify the identity of the player participating in the qualifying activity.

8. A method for verifying an identity of a player participating in a qualifying activity at a gaming establishment, the method comprising:

(a) receiving an indication of a qualifying activity occurring at a table operable to facilitate a wagering game, wherein the indication includes a unique casino chip identifier of at least one casino chip associated with the qualifying activity, wherein the qualifying activity comprises use of the casino chip in association with one of a live or future wagering activity by the player at an electronic table system;

(b) retrieving, from a memory, a unique player identifier of a player associated with the casino chip;

(c) identifying a previously stored image of a player associated with the player identifier, wherein the previously stored image corresponds to an official government-issued identification document that the player had presented to a gaming establishment in order to verify identity;

(d) receiving at least one live image of the player participating in the qualifying activity;

(e) comparing, using facial recognition software, the at least one live image to the stored image to determine whether the player in the stored image is the player in the live image;

(f) only if it is determined that the player in the previously stored image is the player in the live image: (i) determining that the player participating in the qualifying activity is the player corresponding to the unique player identifier, thereby verifying an identity of the player participating in the qualifying activity; and (ii) authorizing the qualifying activity; and (g) if it is not determined that the player in the previously stored image is the player in the live image, performing a remedial action.

9. The method of claim 8, wherein the qualifying activity comprises placement of a casino chip on a bet spot of a table game.

10. The method of claim 8, wherein the qualifying activity comprises an initiation by the player of a new wagering session.

11. The method of claim 8, wherein the stored image comprises an image of the player, obtained prior to the qualifying activity and from a photo identification document provided by the player to a gaming establishment in which the table is located.

12. The method of claim 8, wherein the remedial action comprises storing an indication of a lack of a match between the stored image and the live image.

13. The method of claim 8, wherein the remedial action comprises directing a camera associated with the table to obtain a new live image of the player associated with the qualifying activity and repeating steps (e) through (g) using the new live image as the live image.

14. The method of claim 8, wherein the remedial action comprises transmitting a signal to a dealer of the table, directing the dealer to verify the identity of the player participating in the qualifying activity.

15. The method of claim 8, wherein the table is equipped with RFID sensors and wherein step (a) comprises:

receiving, via an RFID sensor that has detected an RFID-enabled casino chip on the table, an indication of a qualifying activity occurring at a table operable to facilitate a wagering game, wherein the indication includes a unique casino chip identifier of at least one casino chip associated with the qualifying activity, the unique casino chip identifier having been read by the RFID sensor.

16. A controller for verifying an identity of a player participating in a qualifying activity at a gaming establishment, the controller being operable to communicate with at least one electronic table system operable to facilitate a wagering game comprising a card game, wherein the at least one electronic table system comprises (i) at least one game area corresponding to a detecting component operable to detect data relating to a casino chip placed within the respective player area and (ii) at least one camera operable to capture an image of a player participating in the qualifying activity at one of the game areas;

the controller comprising:

a processor; and a memory storing a program for directing the processor, the processor being operable with the memory to:

(a) receive an indication of a qualifying activity occurring at the at least one electronic table system, wherein the indication includes a unique casino chip identifier of at least one casino chip associated with the qualifying activity, the casino chip identifier having been detected by the detecting component of the at least one electronic table system, wherein the qualifying activity comprises an initiation by the player of a new wager on the card game of the at least one electronic table system;

(b) retrieve, from a memory, a unique player identifier of a player associated with the casino chip;

(c) identify a previously stored image of a player associated with the player identifier, wherein the previously stored image corresponds to an official government-issued identification document that the player had presented to a gaming establishment in order to verify identity;

(d) receive, from the at least one camera of the at least one electronic table system, at least one live image of the player participating in the qualifying activity;

(e) compare, using facial recognition software, the at least one live image to the stored image to determine whether the player in the stored image is the player in the at least one live image;

(f) only if it is determined that the player in the stored image is the player in the live image: (i) determine that the player participating in the qualifying activity is the player corresponding to the unique player identifier, thereby verifying an identity of the player participating in the qualifying activity and (ii) authorize the qualifying activity; and (g) if it is not determined that the player in the stored image is the player in the live image, perform a remedial action.

17. A controller for verifying an identity of a player participating in a qualifying activity at a gaming establishment, the controller being operable to communicate with at least one electronic table system operable to facilitate a wagering game comprising a card game, wherein the at least one electronic table system comprises (i) at least one game area corresponding to a detecting component operable to detect data relating to a casino chip placed within the respective player area and (ii) at least one camera operable to capture an image of a player participating in the qualifying activity at one of the game areas;

the controller comprising:

a processor; and a memory storing a program for directing the processor, the processor being operable with the memory to:

(a) receive an indication of a qualifying activity occurring at the at least one electronic table system, wherein the indication includes a unique casino chip identifier of at least one casino chip associated with the qualifying activity, the casino chip identifier having been detected by the detecting component of the at least one electronic table system;

(b) determine a location identifier associated with the casino chip, the location identifier indicating a location at which the qualifying activity is occurring;

(c) identify the at least one camera operable to obtain images of players at the location;

(d) direct the at least one camera to obtain at least one live image;

(e) retrieve, from a memory, a unique player identifier of a player associated with the casino chip;

(f) identify a previously stored image of a player associated with the player identifier, wherein the previously stored image corresponds to an official government-issued identification document that the player had presented to a gaming establishment in order to verify identity;

(g) receive, from the at least one camera of the at least one electronic table system, the at least one live image of the player participating in the qualifying activity;

(h) compare, using facial recognition software, the at least one live image to the stored image to determine whether the player in the stored image is the player in the live image;

(i) only if it is determined that the player in the stored image is the player in the live image: (i) determine that the player participating in the qualifying activity is the player corresponding to the unique player identifier, thereby verifying an identity of the player participating in the qualifying activity and (ii) authorize the qualifying activity; and (j) if it is not determined that the player in the stored image is the player in the live image, perform a remedial action.

18. The controller of claim 17, wherein the live image obtained by the at least one camera includes images of multiple players and wherein step (h) comprises:

compare, using facial recognition software, the at least one live image to the stored image to determine whether the player in the stored image is any of the players in the live image.

19. The controller of claim 18, the processor being further operable with the memory to:

store, if it is determined that the player in the stored image is any of the players in the live image, an indication of the unique player identifier in association with an indication of the qualifying action.

20. A method for verifying an identity of a player participating in a qualifying activity at a gaming establishment, the method comprising:

(a) receiving an indication of a qualifying activity occurring at a table operable to facilitate a wagering game, wherein the indication includes a unique casino chip identifier of at least one casino chip associated with the qualifying activity, wherein the qualifying activity comprises an initiation by the player of a new wager on the table;

(b) retrieving, from a memory, a unique player identifier of a player associated with the casino chip;

(c) identifying a previously stored image of a player associated with the player identifier, wherein the previously stored image corresponds to an official government-issued identification document that the player had presented to a gaming establishment in order to verify identity;

(d) receiving at least one live image of the player participating in the qualifying activity;

(e) comparing, using facial recognition software, the at least one live image to the stored image to determine whether the player in the stored image is the player in the live image;

(f) only if it is determined that the player in the previously stored image is the player in the live image: (i) determining that the player participating in the qualifying activity is the player corresponding to the unique player identifier, thereby verifying an identity of the player participating in the qualifying activity; and (ii) authorizing the qualifying activity; and (g) if it is not determined that the player in the previously stored image is the player in the live image, performing a remedial action.

21. A method for verifying an identity of a player participating in a qualifying activity at a gaming establishment, the method comprising:

(a) receiving an indication of a qualifying activity occurring at a table operable to facilitate a wagering game, wherein the indication includes a unique casino chip identifier of at least one casino chip associated with the qualifying activity;

(b) determining a location identifier associated with the casino chip, the location identifier indicating a location at which the qualifying activity is occurring;

(c) identifying at least one camera operable to obtain images of players at the location;

(d) directing the at least one camera to obtain at least one live image;

(e) retrieving, from a memory, a unique player identifier of a player associated with the casino chip;

(f) identifying a previously stored image of a player associated with the player identifier, wherein the previously stored image corresponds to an official government-issued identification document that the player had presented to a gaming establishment in order to verify identity;

(g) receiving the at least one live image of the player participating in the qualifying activity;

(h) comparing, using facial recognition software, the at least one live image to the stored image to determine whether the player in the stored image is the player in the live image;

(i) only if it is determined that the player in the previously stored image is the player in the live image: (i) determining that the player participating in the qualifying activity is the player corresponding to the unique player identifier, thereby verifying an identity of the player participating in the qualifying activity; and (ii) authorizing the qualifying activity; and (j) if it is not determined that the player in the previously stored image is the player in the live image, performing a remedial action.

22. The method of claim 21, wherein the live image obtained by the camera includes images of multiple players and wherein step (h) comprises:

comparing, using facial recognition software, the at least one live image to the stored image to determine whether the player in the stored image is any of the players in the live image.

23. The method of claim 22, further comprising:

storing, if it is determined that the player in the stored image is any of the players in the live image, an indication of the unique player identifier in association with an indication of the qualifying action.

* * * * *